UNITED STATES PATENT OFFICE.

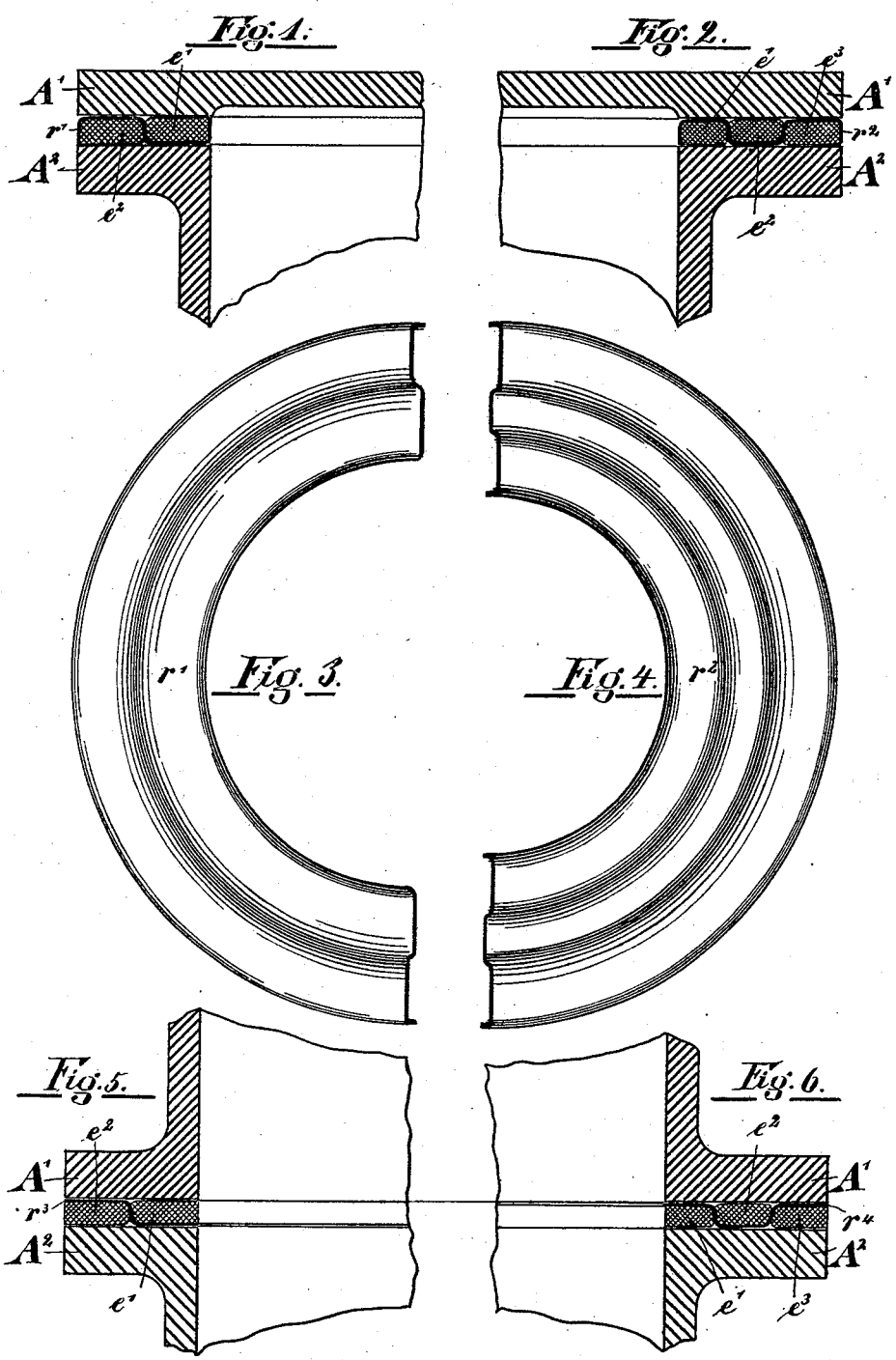

CARL FROMM, OF STUTTGART, WÜRTEMBERG, GERMANY.

PACKING-RING.

SPECIFICATION forming part of Letters Patent No. 456,243, dated July 21, 1891.

Application filed October 20, 1890. Serial No. 368,704. (No model.)

*To all whom it may concern:*

Be it known that I, CARL FROMM, a subject of the King of Würtemberg, residing at Stuttgart, Würtemberg, Germany, have invented a new and useful Improvement in Packing-Rings, of which the following is a specification.

In the present invention I propose to prevent the blowing out of packing material ordinarily used—such as gum, asbestus, hemp, and the like—between the flanges to be packed, and at the same time to see that these packing materials press closely against the surfaces to be packed in such a manner that the packing is effected by forcing the soft material against and into intimate contact with both walls of the seam to be packed or calked, and not merely the protecting wire-gauze or soft-metal ring.

I attain the above by placing between the flanges to be packed soft metal or a ring of wire-gauze S-shaped or undulating in cross-section, and by placing into the annular gutters or grooves so formed the soft or plastic packing material; but to more fully explain my invention reference is had to the accompanying drawings, in which—

Figure 1 represents in longitudinal section a portion of the end of a pipe whose seam is provided with a packing-ring embodying my invention; Fig. 2, a similar view representing a modified form of packing-ring; Figs. 3 and 4, plan views of the metallic protecting-rings shown in Figs. 1 and 2, respectively, and Figs. 5 and 6 longitudinal sections of pipes, showing two further modifications of packing-rings.

It will be noted that the packing-rings shown as the preferred embodiment of my invention consist of a series of concentric rings $e'$ $e^2$ $e^3$ $e^4$, of soft packing material—such as rubber, asbestus, hemp, &c.—bearing alternately against the upper and lower walls of the seam to be packed, and sustained and prevented from displacement by thin protecting-rings of soft metal or wire-gauze $r'$ $r^2$ $r^3$ $r^4$, whose vertical walls $w'$ $w^2$, &c., form partitions between the concentric packing-rings, while their upper and lower faces are clamped between the soft packing material and the upper and lower walls alternately of the seam to be packed. Where but two concentric rings are used the metal ring will be S-shaped in cross-section. Where more than two such concentric rings are employed its form will be undulating. Although the vertical walls $w'$ $w^2$, &c., between the upper and lower groove are in most instances sufficient to prevent the displacement or blowing out of the soft packing material, I prefer the construction of the metallic protecting-ring illustrated in Figs. 1 and 2, and where the additional safeguard of the outer turned-down flanges $f$ is provided, which insure the absolute retention of the entire packing material.

On pressing the flanges $A'$ $A^2$ (see drawings) together, the inlaid rings $e'$ $e^2$ $e^3$ press with one surface directly against one or the other surfaces of flanges $A'$ $A^2$, thus insuring a perfect packing, while the vertical walls $w'$ $w^2$, &c., of the metal protecting-rings $r'$ or $r^2$ $r^3$ $r^4$, (shown in Figs. 1, 2, 5, and 6,) respectively, prevent the inlaid packing material $e'$ $e^2$ $e^3$, &c., from being blown out.

According as the pressure is low or high the protecting or retaining rings may be formed with one, two, three, four, &c., annular retaining-gutters for the soft packing $e$. As already stated, these protecting-rings $r'$ $r^2$, &c., may be provided with turned-down outer flanges $f$, as shown in Figs. 1 and 2, or they may end with a thin outer edge, as shown in Figs. 5 and 6.

Compared with other packings mine presents the advantage that it can be used between uneven flanges—for example, between flanges which have not been faced or trued up—without placing too great a strain upon them and still form a perfect packing, and prevents the breaking of the flanges, which often happens when soft metal or wire-gauze packing is used and the necessary capacity to yield laterally does not exist.

The concentric packing-rings $e'$ $e^2$, &c., are oblong in cross-section, and the protecting-rings $r'$ $r^2$, &c., have their upper and lower faces flattened. By this means these protecting and retaining rings are securely clamped between the concentric rings and the upper and lower walls of the seam to be packed.

What I claim, and desire to secure by Letters Patent, is—

1. In a packing-ring, the combination of two concentric rings of non-metallic packing material with a thin protecting-ring of soft metal having a vertical partition-wall between the concentric rings, and an upper and lower horizontal flange extending in opposite directions, whereby the packing is formed entirely by the non-metallic concentric rings of non-metallic packing material, and the said non-metallic packing material is prevented from being blown out, substantially as set forth.

2. In a packing-ring, the combination, with concentric rings of non-metallic packing material, of a protecting-ring of wire-gauze having a partition wall or walls between the concentric rings and upper and lower flanges, whereby the packing is formed entirely by the non-metallic material, and the same is held against blowing out, substantially as set forth.

In testimony whereof I have signed this specification in the presence of two subscribing witnesses.

CARL FROMM.

Witnesses:
A. B. DRAUTZ,
A. HERRMANN.